United States Patent [19]

Bohl et al.

[11] Patent Number: 4,854,481

[45] Date of Patent: Aug. 8, 1989

[54] COLLAPSIBLE FLUID STORAGE RECEPTACLE

[75] Inventors: Aleck Bohl, Denver; Leandro Valdez, Arvada, both of Colo.

[73] Assignee: The Gates Rubber Company, Denver, Colo.

[21] Appl. No.: 191,317

[22] Filed: May 9, 1988

[51] Int. Cl.4 .............................................. B65D 35/16
[52] U.S. Cl. ..................................... 222/94; 222/107; 222/386.5; 141/114; 206/521
[58] Field of Search .............................. 222/92, 94–96, 222/101–102, 107, 386, 386.5; 141/1, 114; 206/521; 150/55; 383/107

[56] References Cited

U.S. PATENT DOCUMENTS

| | | | |
|---|---|---|---|
| 2,865,419 | 12/1958 | Cunningham | 383/41 X |
| 2,930,423 | 3/1960 | Cunningham et al. | 222/94 |
| 3,067,810 | 12/1962 | Mozic | 222/386.5 X |
| 3,170,600 | 2/1965 | Pierson | 222/94 |
| 3,334,676 | 8/1967 | Girard | 150/55 |
| 3,342,377 | 9/1967 | Peredy | 222/386.5 X |
| 3,945,539 | 3/1976 | Sossong | 222/386.5 |
| 4,147,278 | 4/1979 | Uhlig | 222/94 |
| 4,567,918 | 2/1986 | Curiel | 141/1 |
| 4,597,425 | 7/1986 | Tally | 150/55 |
| 4,714,178 | 12/1987 | Bohl et al. | 222/107 |
| 4,757,917 | 7/1988 | Gleich et al. | 222/95 |

FOREIGN PATENT DOCUMENTS 6602958  9/1966  Netherlands ........................ 222/94

*Primary Examiner*—Michael S. Huppert
*Attorney, Agent, or Firm*—C. H. Castleman, Jr.; H. W. Oberg, Jr.; J. E. Ebel

[57] ABSTRACT

A collapsible fluid storage receptacle comprising a generally cylindrical elastomeric reinforced inner bladder and a generally cylindrical elastomeric reinforced outer casing that substantially surrounds the inner bladder in such a way that at least an interior reservoir and an outer reservoir are defined. A sealingly attached first outlet permitting fluid communication between the interior reservoir and the exterior of the fluid storage receptacle, as well as a sealingly attached second outlet permitting fluid communication between the outer reservoir and the exterior of the fluid storage receptacle, are included to aid in the filling up and the dispensing of fluid.

17 Claims, 2 Drawing Sheets

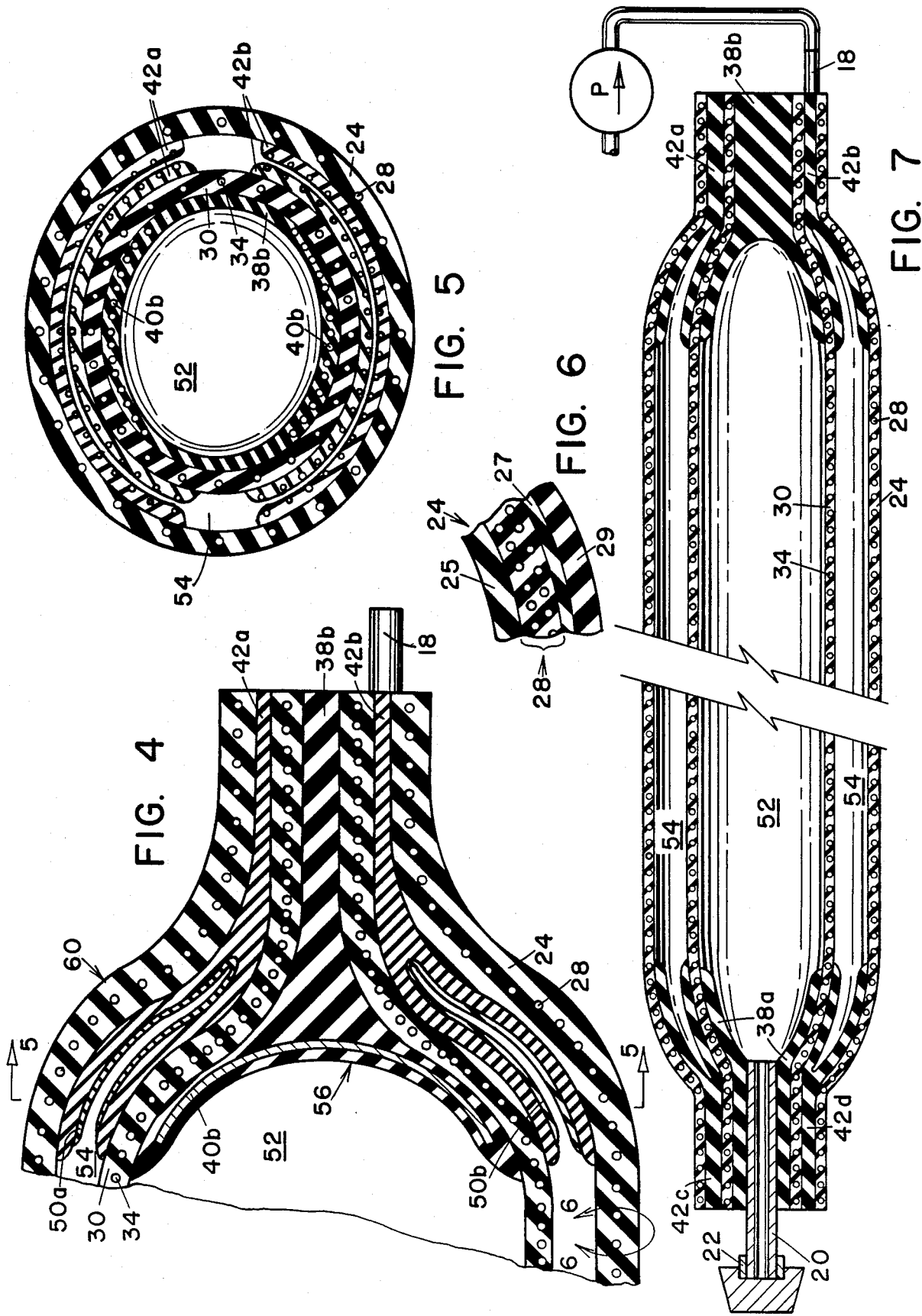

COLLAPSIBLE FLUID STORAGE RECEPTACLE

FIELD OF THE INVENTION

In general, this invention relates to resilient durable fluid storage and dispensing receptacles having at least two reservoirs which, individually or together, can be collapsed by the application of force per unit area (or pressure) from, for example, a low pressure air pump, a pressurized air line, or a heavy mass placed or rolled on top of the receptacle to efficiently expel the fluid contained in the receptacle; and more particularly this invention relates to such storage receptacles capable of being transported by fitting into a relatively small space such as the space beneath the seats in a helicopter or other vehicle, and capable of being dropped to the ground from a moving or airborne vehicle to locations in need of the contents of the receptacle.

DESCRIPTION OF THE PRIOR ART

Single reservoir, collapsible fluid storage receptacles that are known in the art typically provide for one or more of the following methods of dispensing their contents: running over the receptacle with the traction means of a vehicle; connecting the reservoir containing the fluid to a source of compressed air to force air into the reservoir thereby displacing the fluid; rolling, folding, or squeezing the container; or employing gravity to drain the reservoir. Various methods of dispensing single reservoir, collapsible vessels are disclosed in U.S. Pat. Nos. 4,714,178 to Bohl et al., 4,567,918 to Curiel, 4,597,425 to Tally, 3,334,676 to Girard, and 2,865,419 to Cunningham.

Two-reservoir fluid storage receptacles having an interior reservoir and a surrounding exterior reservoir are known to dispense the fluid contained in the interior reservoir by introducing an expulsion fluid into the exterior reservoir, thus applying pressure to the wall of the interior reservoir. These two-reservoir receptacles typically have a rigid outer tank wall and a flexible interior lining or bladder that contains the fluid to be dispensed, so that the only method of dispensing that can be employed is the method of introducing an expulsion fluid into the exterior reservoir.

Examples of such two-reservoir fluid storage receptacles are disclosed in U.S. Pat. Nos. 3,067,810 to Mozic, 3,342,377 to Peredy, 3,945,539 to Sossong, and 4,147,278 to Uhlig. Uhlig also discloses a two-reservoir hand-held fluid receptacle that has an outer flexible container surrounding an inner flexible bag containing the fluid; between the outer container and inner bag is a pressure chamber with a side opening allowing the pressure chamber to communicate with the exterior of the receptacle. The fluid is dispensed by covering the side opening with a finger or thumb to prevent air from escaping the pressure chamber and then squeezing the outer container by hand.

Disadvantages in prior art devices are apparent. The known single reservoir, collapsible receptacles that are capable of storing a large amount of fluid (20-200 gallons), require some type of large mass to collapse the receptacle and effectively dispense the fluid contained therein. And the use of compressed air introduced into the fluid-filled reservoir to force out the fluid often produces undesirable results for certain types of fluids such as motor vehicle fuel or fluids capable of dissolving the air. Receptacles relying on gravity to dispense their contents, whether collapsible or rigid, are inefficient and ineffective dispensers. The two-reservoir receptacles disclosed having a rigid outer tank wall and a flexible interior lining or bladder, typically rely solely on a pump, line source, or other manner of introducing an expulsion fluid into the exterior reservoir. Therefore, if the expulsion fluid introduction mechanism malfunctions, there is no alternative way of dispensing the fluid except destruction of the receptacle. In addition, receptacles having rigid outer tank walls typically take up valuable space, wherever stored.

The designs of known two-reservoir receptacles having either rigid or flexible outer tanks/containers, as disclosed, are not practical for low cost reproduction using elastomeric materials; in addition these designs cannot be used to produced durable, leak-proof elastomeric receptacles.

It is a primary object of this invention to provide an improved, generally portable, collapsible, fluid storage receptacle that is capable of receiving two dissimilar fluids, and is capable of easily dispensing the fluid contained in an innermost/interior reservoir by applying pressure directly to the outer surface of the outer walls of either the innermost/interior reservoir or an outer reservoir to collapse at least the innermost/interior reservoir; wherein pressure is applied to the walls of either the innermost/interior reservoir or an outer reservoir, depending upon the source of pressure available.

It is another object to provide an improved, generally lightweight and portable, fluid storage receptacle that can be filled with a fluid or fluids and easily stored in a relatively small space.

It is yet another object to provide an improved fluid storage receptacle capable of storing fuel such as that used to power motorized vehicles, and capable of subsequently dispensing the fuel to refuel a motorized vehicle in such a way as to not disrupt the vehicle's operation time.

A further object of this invention is to produce such a fluid storage receptacle by proper design and positioning of an inner bladder and an outer casing so that the inner bladder is protected from puncture and harsh environmental conditions.

A still further object is to produce such a fluid storage receptacle having at least two reservoirs by proper design of an elastomeric inner bladder that is generally impermeable so that, when required, the fluids contained in the reservoirs do not substantially mix.

It is also an object to produce a reusable fluid storage receptacle having at least two reservoirs by proper design and durable construction of both an inner bladder and an outer casing, and by proper design and placement of reinforced elastomeric inserts and pockets to adequately seal the receptacle upon pressurization of any of the reservoirs, so that the receptacle is capable of remaining sealed upon impact of the receptacle with the ground after being dropped from the air.

It is yet a further object to produce a fluid storage receptacle by proper simplified design to minimize its cost of production.

SUMMARY OF THE INVENTION

Briefly described the collapsible fluid storage receptacle of the invention includes: a generally cylindrical elastomeric reinforced inner bladder having two ends and interior and exterior sidewalls, a substantial portion of the interior sidewall of the inner bladder defining an interior reservoir; a generally cylindrical elastomeric reinforced outer casing having an interior sidewall that substantially surrounds the inner bladder, a substantial portion of the exterior sidewall of the inner bladder and a substantial portion of the interior sidewall of the outer casing defining an outer reservoir; means for permitting fluid communication between the interior reservoir and the exterior of the fluid storage receptacle; and means for permitting fluid communication between the outer reservoir and the exterior of the fluid storage receptacle.

BRIEF DESCRIPTION OF THE DRAWINGS

The invention in its preferred embodiments will be more particularly described by reference to the accompanying drawings, in which like numerals designate like parts, and in which:

FIG. 4 is an enlarged, partial sectional view taken along 4—4 of FIG. 3 illustrating in greater detail the end portion of a preferred receptacle with its interior and exterior reservoirs in a pressurized state;

FIG. 5 is a cross-sectional view taken along 5—5 of FIG. 4;

FIG. 6 is an enlarged partial sectional view taken along line 6—6 of FIG. 4 illustrating in greater detail the reinforced outer casing; and FIG. 7 is a sectional view similar to that of FIG. 4, except that it illustrates both end portions of a preferred receptacle.

PREFERRED EMBODIMENTS OF THE INVENTION

Although the embodiment shown, as well as an embodiment not shown, will be particularly described herein, it will be appreciated that the elements of the collapsible fluid storage receptacle of the invention can take on various shapes and the receptacle can be constructed in many different ways, other than that particularly described; and it will be appreciated that various fluids can be introduced and/or contained in the receptacle.

Figure 1:
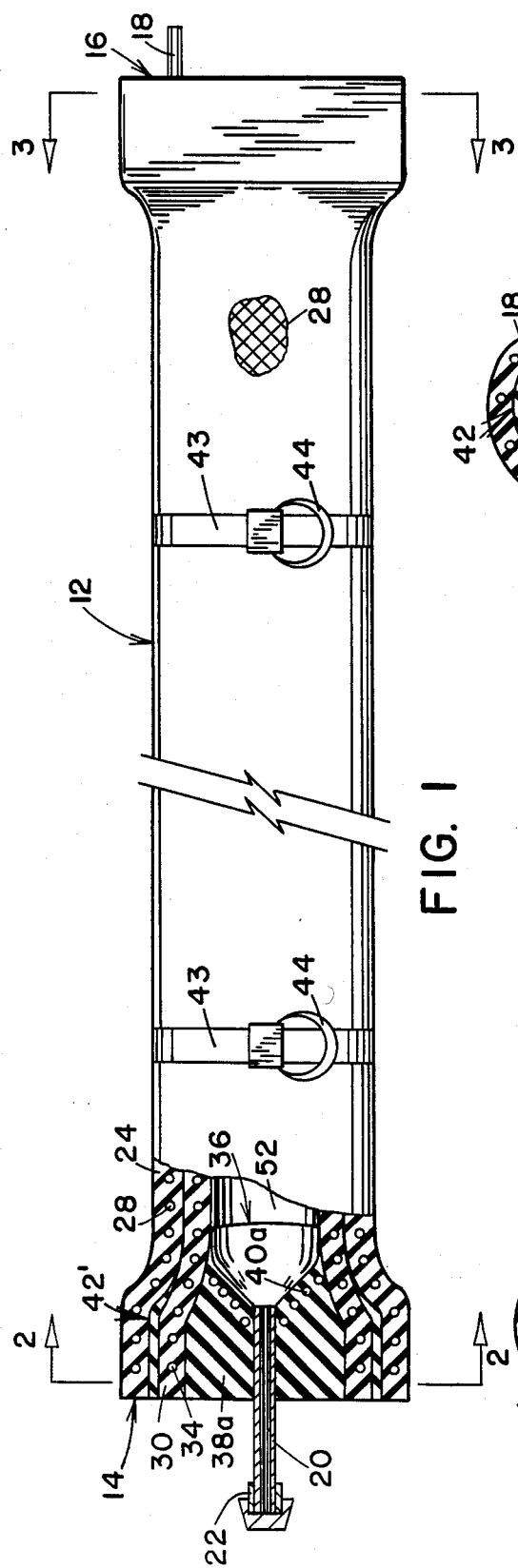
FIG. 1 is a top plan view, partially broken away, depicting a preferred collapsible fluid storage receptacle of the invention with its interior reservoir in a pressurized state.

Referring to FIG. 1, preferably the receptacle comprises: a generally cylindrical body portion 12; two distal end portions 14, 16 configured and sealed as further explained below; a first outlet shown as extended nozzle 20, having an appropriate fitting assembly 22, allowing interior reservoir 52 to be in communication with the exterior of the receptacle; and a second outlet shown as extended nozzle 18 communicating with an exterior reservoir. Interior reservoir 52 is shown in its expanded, pressurized state. However, upon removal of the fluid contained in interior reservoir 52, the interior sidewall of inner bladder 30 will substantially collapse and flatten against itself. The cylindrical shape of body 12 allows the receptacle to be manufactured at a low cost since both the inner bladder 30 and the outer casing 24 can be produced in a manner similar to the well known methods used to produce reinforced, mandrel-built, hose or elastomeric endless belt sleeves. In addition, the shown preferred shape of body 12 allows the receptacle to fit into the storage space beneath the seats of a vehicle, such as a helicopter. Handles 44 and strap members 43 are provided for ease of transporting the receptacle.

The generally cylindrical elastomeric carcass/outer casing 24 of body 12, is preferably formed of at least an elastomeric outer cover layer and inner layers made of the same or compatible elastomers, and the outer casing 24 preferably includes reinforcement 28, as shown and more particularly described below. Cylindrical inner bladder 30 preferably has at least an interior lining (not particularly shown) resistant to and compatible with the fluid contained within interior reservoir 52 and outer layers (not particularly shown) made of the same or compatible elastomers, and inner bladder 30 has a layer of reinforcement shown as 34. The elastomeric materials used will be chosen for their specific properties and can be chosen from natural or synthetic rubbers such as acrylonitrile butadiene polymer, carboxylated nitrile rubber, neoprene or EPDM, blended with or without suitable fillers, plastic materials, reinforcing agents, accelerators, curing agents and the like, as is well known in the art.

The reinforcement layers shown as 28, 34 preferably have reinforcement members selected from various materials and configurations, including filaments or fabrics disposed in such a manner that prevents burst of either the outer casing 24 or inner bladder 30 upon pressurization and/or rough handling of the receptacle. The reinforcement could be applied in the form of spiraled filaments preferably disposed at an angle relative to the longitudinal axis of the receptacle that is close to the locked angle, i.e. somewhere from about 54–56 degrees relative to the longitudinal axis. This angle is preferred so that body portion 12 will not substantially expand. Thus, a receptacle can be stored in a relatively small space, such as the space existing beneath the seats in a helicopter, while its outer reservoir is pressurized or its interior reservoir is filled and/or dispensed of its contents. Typical materials which may be used as reinforcement include fibers of rayon, nylon, polyester, or an aramid in the form of yarn, alternate spiral courses, cord, braid, a hybrid of spiral and braid, knit, tire cord, wrap or the like. Reinforcement layers 28, 34 are each preferably comprised of a reinforcement member sandwiched between thin "skimmed" layers of an elastomer such as neoprene, which is shown more particularly at 28 in FIG. 6.

Figure 2:
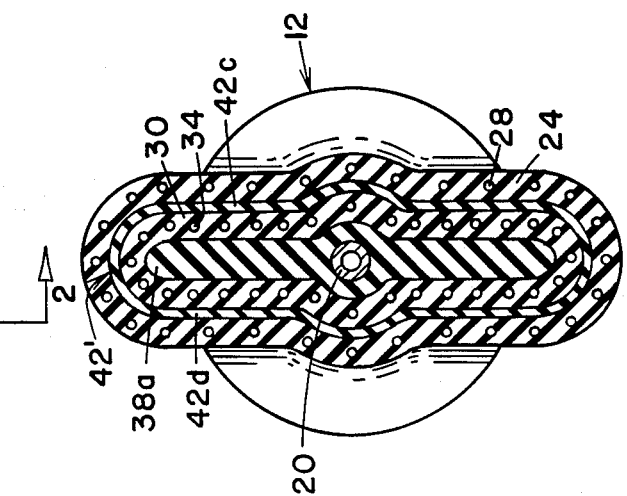
FIG. 2 is an end section view of the receptacle of FIG. 1 taken along 2—2 showing one of the flattened ramped end portions of the inner bladder interposed in one of the two pinched ramp-ends of the outer casing and the position of a first outlet opening into the interior reservoir.

Shown generally at 36 in FIG. 1 is a first insert comprised of an elastomeric portion 38a in which reinforcement 40a is embedded. Elastomeric portion 38a is sandwiched between juxtaposed interior sidewall portions of the inner bladder 30, and bonded thereto preferably by covulcanization to form a flattened ramped end portion which has a cross-linked vulcanizate. The interior lining (not specifically shown) of the inner bladder 30 should be compatible with the surfaces of elastomeric portion 38a which the interior lining contacts. First insert 36 is positioned to form a reinforcement bridge between juxtaposed interior sidewall portions of inner bladder 30 to inhibit separation of the flattened ramped end portion upon pressurization of the interior reservoir 52. Shown at 42' is the joining point of a first pocket 42c and a second pocket 42d (as shown in FIGS. 2 and 7), both of which are preferably made of an elastomer. Pockets 42c, 42d, although initially positioned as two separate pieces, are vulcanized together with juxtaposed sidewall portions of the outer 24 and inner bladder 30 in such a manner that the pockets 42c, 42d will likely "flow" and join at 42'.

In accordance with the invention, FIG. 2 illustrates distal end portion 14. As shown, the flattened ramped end portion of inner bladder 30 is interposed in one of the pinched ramp-ends of the outer casing 24 with a first pocket 42c and a second pocket 42d sandwiched therebetween. Joining point 42' of pockets 42c, 42d which results from vulcanization of the pockets 42c, 42d with the outer casing 24 and inner bladder 30 is also shown in FIG. 2. Extended nozzle or first outlet 20 is preferably embedded in elastomeric portion 38a of the first insert. It is critical that extended nozzle or first outlet 20 be properly sealed to elastomeric portion 38a to ensure that the fluid contained in interior reservoir 52 does not contact the interface between the nozzle 20 and elastomeric portion 38a to diminish the effect of the reinforcement bridge as formed by first insert 36.

Figure 3:
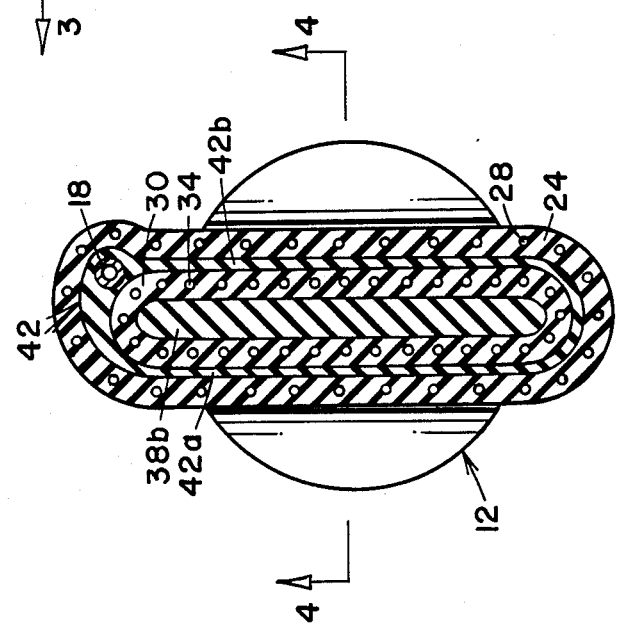
FIG. 3 is an end sectional view of the receptacle of FIG. 1 taken along 3—3 showing the other flattened ramped end portion of the inner bladder interposed in the other pinched ramp-end of the outer casing and the position of a second outlet opening into the outer reservoir.

FIG. 3 illustrates the preferred distal end portion 16, which is constructed in a manner similar to distal end portion 14 except that extended nozzle or second outlet 18 is embedded into the elastomeric material that forms joining point 42. Joining point 42 is formed by the vulcanization of an elastomeric third pocket 42a and an elastomeric fourth pocket 42b together with juxtaposed sidewall portions of the outer casing 24 and inner bladder 30, in such a manner that the edges of pockets 42a and 42b will likely "flow" together.

FIG. 4 shows, in greater detail, the preferred construction of distal end portion 16, which generally is similar to that of distal end portion 14 except for the inclusion and location of extended nozzle or second outlet 18. Shown generally at 56 is a second insert comprised of an elastomeric portion 38b in which reinforcement 40b is embedded. Elastomeric portion 38b is sandwiched between juxtaposed interior sidewall portions of the inner bladder 30, and bonded thereto in a manner similar to the bonding of the first insert 36 and inner bladder 30. Second insert 56 is positioned in a manner similar to the positioning of first insert 36, so that a reinforcement bridge is formed at distal end portion 16 between juxtaposed interior sidewall portions of inner bladder 30. Thus, pressure developed within interior reservoir 52 will be distributed over the interior sidewall of inner bladder 30, as well as the inner faces of first and second inserts 36, 56, rather than being concentrated at the areas where the interior sidewall of inner bladder 30 would meet if each of the two ends of inner bladder 30 were flattened without any inserts added. It is critical that the interior sidewall of inner bladder 30 and the inner faces of first and second inserts 36, 56 be made of a material that is resistant to the fluid contained in interior reservoir 52.

Shown, also in FIG. 4, are an elastomeric third pocket 42a and an elastomeric fourth pocket 42b, each with its own respective added reinforcement 50a, 50b. Pocket 42a is positioned between, and bonded to, juxtaposed sidewall portions of outer casing 24 and inner bladder 30 along the top flattened surface of the flattened ramped end portion of inner bladder 30; pocket 42b is similarly positioned and bonded along the bottom flattened surface of the flattened ramped end portion of inner bladder 30. The surfaces of pockets 42a, 42b, inner bladder 30, and outer casing 24 which come into contact, must be compatible so that proper bonding occurs to seal the receptacle. Distal end portion 16, which is pressed together to form a pinched ramp-end of outer casing 24, has an upper and lower ramped surface (the upper ramped surface shown at 60). In addition, an outer reservoir 54 is defined which is allowed to communicate with the exterior of the receptacle by way of extended nozzle or second outlet 18 through a connecting passageway (not shown).

Pockets 42a, 42b are positioned so that they each form a reinforcement bridge to inhibit separation of the pinched ramp-end upon pressurization of outer reservoir 54. Pressure developed within outer reservoir 54 will be distributed over the sidewalls defining the outer reservoir, as well as the inner faces of pockets 42a, 42b. The interior sidewall of outer casing 24, the exterior sidewall of inner bladder 30, and the inner faces of pockets 42a, 42b, 42c, 42d must be made of a material that is resistant to the fluid introduced into outer reservoir 54.

The reinforcement that is embedded in both inserts 36, 56 and the separate reinforcement that is bonded to all pockets 42a, 42b, 42c, 42d can be made from a textile fabric, tire cord or the like, the preferred form being tire cord of fairly tight pack which is disposed so that the "bridging effect" of the inserts 36, 56 and pockets 42a, 42b, 42c, 42d as explained above, is sufficient to inhibit separation of the receptacle upon pressurization and/or rough handling.

Although not particularly shown, preferably the first and second inserts 36, 56 can be comprised of: an inner elastomeric member compatible with the material to which it is bonded; an outer elastomeric layer having an inner face which is compatible with the fluid to which it directly contacts; and a tie gum elastomer layer having reinforcement, respectively 40a, 40b, disposed therewithin—the tie gum elastomer layer to be sandwiched between, bonded to, and compatible with the inner elastomeric member and the outer elastomeric member so that the reinforcement 40a, 40b will be properly embedded within the insert. As an example, the inner elastomeric member and the outer elastomeric layer of an insert as immediately described above, was formed of NBR rubber (acrylonitrile butadiene). The insert was formed into an envelope configuration using plies of gum stock and tire cord as the tie gum layer, with the tire cord plies having original dimensions of approximately 16½ inches by 13 inches.

An example of a third pocket 42a and fourth pocket 42b that has been found useful in practice is: forming each pocket 42a, 42b into an envelope configuration using NBR rubber (acrylonitrile butadiene) and plies of tire cord as reinforcement 50a, 50b.

Although the size of the receptacle can vary greatly, preferably the inner diameter of the inner bladder 30 is maximized to maximize the capacity of interior reservoir 52 while the inner diameter of the outer casing is minimized, thus forming an outer reservoir 54 which has a relatively small capacity. Minimizing the spacing between the exterior sidewall of the inner bladder 30 and interior sidewall of the outer casing 24, which results in minimizing the capacity of the outer reservoir 54, has been found to increase the burst strength of the inner bladder as well as decrease the time it takes to sufficiently pressurize outer reservoir 54. As an example, the ratio of inner diameter of the inner bladder to inner diameter of the outer casing can be approximately 0.96.

FIG. 5, which is a cross-section of the receptacle taken near distal end portion 16, also represents the cross-section of the receptacle as taken near distal end portion 14. As a result of forming second insert 56 into an envelope configuration, reinforcement 40b, which is embedded in elastomeric portion 38b, is confined substantially to upper and lower surfaces of the insert 56. This permits flexing of the lateral sides of second insert 56 upon pressurization and depressurization of interior reservoir 52, thus increasing the insert's usable life.

FIG. 6 illustrates the preferred construction of outer casing 24. As an example, outer cover layer 29 was made of carboxylated nitrile rubber, reinforcement shown as 28 was made of nylon cord "skimmed" with layers of neoprene, and adhesion gum layers 25, 27 made of neoprene were added to ensure proper bonding and strength of outer casing 24. As an example, inner bladder 30 can be constructed just like the outer casing 24 (as described immediately above and shown in FIG. 6) except that the inner bladder 30 will have no outer cover layer 29, but instead will have an interior lining of NBR rubber bonded to layer 25.

In the preferred way of constructing the receptacle shown in FIG. 7, both the outer casing 24 and inner bladder 30 are separately mandrel built and then each is vulcanized into a tubular shape. The first and second inserts, shown as elastomeric portions 38a and 38b without reinforcement, are positioned within inner bladder 30 with extended nozzle 20 penetrating the first insert. Two flattened ramped end portions are formed with inner bladder 30, and the first and second inserts are vulcanized together with inner bladder 30. The inner bladder 30 is pulled through the tubular outer casing 24. Pockets 42a, 42b, 42c, 42d are positioned and extended nozzle 18 is added. Two pinched ramp-ends are formed with the outer casing 24 and distal end portions 14, 16 (as shown in FIG. 1) are vulcanized to finally seal the receptacle.

In operation, the pump shown schematically in FIG. 7 is used to introduce a fluid e.g. air, into outer reservoir 54 which initially is in a vacuum state. As the pressure within outer reservoir 54 becomes greater than that within interior reservoir 52, the fluid being stored in interior reservoir 52 is gradually expelled due to the pressure differential between the two reservoirs 54, 52. The force thus exerted on the exterior sidewall of inner bladder 30 causes it to collapse. During tests of an example receptacle, a 15 foot long receptacle was used which had an interior reservoir with a capacity of 65 gallons, a first outlet 20 having a diameter of approximately $\frac{3}{4}$ inch, a second outlet 18 having a diameter of approximately $\frac{1}{4}$ inch, an inner bladder with an inner diameter of 10$\frac{3}{4}$ inches, an outer casing with an inner diameter of 11$\frac{1}{4}$ inches, and a $\frac{1}{8}$ inch spacing between the exterior sidewall of the inner bladder and interior sidewall of the outer casing. The interior reservoir 52 was dispensed of 99 percent of its contents (full capacity being 65 gallons of fluid) in 2–3 minutes when the air pressure introduced through nozzle 18 into outer reservoir 54 was maintained at 20 pounds per square inch gauge, and in 5–6 minutes when the pressure introduced into outer reservoir 54 was maintained at 4 pounds per square inch gauge.

Although not shown, an alternative embodiment of the invention would have the same inner bladder 30, first and second insert, and extended nozzle 20 assembly as shown in FIG. 6. However, a similarly constructed assembly having an outer casing 24, first and second pocket, and second outlet 18 could be built around the inner bladder assembly without interposing the flattened ramped end portions of the inner bladder within the pinched ramp-ends of the outer casing. This would eliminate the need of positioning four pockets (42a, 42b, 42c, 42d) to inhibit separation of the pinched ramp-ends upon pressurization of an outer reservoir, thus requiring only two pockets positioned in a manner similar to how the first and second inserts are positioned in FIG. 7. Extended nozzle 20, allowing interior reservoir 52 to be in communication with the exterior of the receptacle, would penetrate either the sidewall of the outer casing 24 or one of the two pockets.

While certain representative embodiments and details have been shown for the purpose of illustrating the invention, it will be apparent to those skilled in this art that various changes and modifications may be made therein without departing from the spirit or scope of the invention.

What is claimed is:

1. A collapsible fluid storage receptacle comprising:
   a generally cylindrical elastomeric reinforced inner bladder having a flattened ramped end portion and interior and exterior sidewalls, a substantial portion of the interior sidewall of the inner bladder defining an interior reservoir;
   a generally cylindrical elastomeric reinforced outer casing having a pinched ramp-end and an interior sidewall that substantially surrounds the inner bladder, the flattened ramped end portion being interposed in the pinched ramp-end, a substantial portion of the exterior sidewall of the inner bladder and a substantial portion of the interior sidewall of the outer casing defining an outer reservoir;
   means for permitting fluid communication between the interior reservoir and the exterior of the fluid storage receptacle; and
   means for permitting fluid communication between the outer reservoir and the exterior of the fluid storage receptacle.

2. A collapsible fluid storage receptacle comprising:
   a generally cylindrical elastomeric reinforced inner bladder having two ends and interior and exterior sidewalls, a substantial portion of the interior sidewall of the inner bladder defining an interior reservoir;
   a first and second insert formed of reinforced elastomer, each of which is bonded to juxtaposed interior sidewall portions of one of the two ends of the inner bladder so that a reinforcement bridge is formed thereby;
   a generally cylindrical elastomeric reinforced outer casing having an interior sidewall that substantially surrounds the inner bladder, a substantial portion of the exterior sidewall of the inner bladder and a substantial portion of the interior sidewall of the outer casing defining an outer reservoir;
   means for permitting fluid communication between the interior reservoir and the exterior of the fluid storage receptacle; and
   means for permitting fluid communication between the outer reservoir and the exterior of the fluid storage receptacle.

3. The fluid storage receptacle of claim 2 wherein each one of the two ends of the inner bladder forms a flattened ramped end portion and the outer casing is formed to have two pinched ramp-ends; the fluid storage receptacle to further comprise a first and second pocket formed of reinforced elastomer, each of which is bonded to juxtaposed interior sidewall portions of the outer casing nearby one of the two pinched ramp-ends to form a reinforcement bridge thereby.

4. A collapsible fluid storage receptacle comprising:
a generally cylindrical elastomeric reinforced inner bladder having two ends and interior and exterior sidewalls;
a first and second insert formed of reinforced elastomer, each of which is bonded to juxtaposed interior sidewall portions of one of the two ends of the inner bladder so that a reinforcement bridge is formed thereby; a substantial portion of the interior sidewall of the inner bladder and portions of the first and second insert defining an interior reservoir;
means for permitting fluid communication between the interior reservoir and the exterior of the fluid storage receptacle;
a generally cylindrical elastomeric reinforced outer casing having two pinched ramp-ends and having an interior sidewall that substantially surrounds the inner bladder;
a first, second, third, and fourth pocket formed of reinforced elastomer, each of which is bonded to juxtaposed sidewall portions of the outer casing and the inner bladder to form four reinforcement bridges therebetween; a substantial portion of the exterior sidewall of the inner bladder, a substantial portion of the interior sidewall of the outer casing, and portions of the first, second, third, and fourth pockets defining an outer reservoir; and
means for permitting fluid communication between the outer reservoir and the exterior of the fluid storage receptacle.

5. The fluid storage receptacle of claim 4 wherein each one of the two ends of the inner bladder forms a flattened ramped end portion interposed in one of the two pinched ramp-ends of the outer casing; the first and second inserts are adapted and arranged to inhibit separation of the two flattened ramped end portions of the inner bladder upon pressurization of the interior reservoir; and wherein the first, second, third, and fourth pockets are adapted and arranged to inhibit separation of the two pinched ramp-ends of the outer casing upon pressurization of the outer reservoir.

6. The fluid storage receptacle of claim 4 wherein each of the first and second inserts further comprise:
an inner elastomeric member compatible with the material to which it is bonded;
an outer elastomeric member compatible with the fluid to which it directly contacts; and
a tie gum elastomer having reinforcement disposed therewithin, the tie gum elastomer to be sandwiched between, bonded to, and compatible with the inner elastomeric member and the outer elastomeric member.

7. The storage receptacle of claim 4 wherein each of the first and second inserts have an extended plug portion sandwiched between the interior sidewalls of the inner bladder and positioned nearby one of the two ends thereof, and wherein the two ends of the inner bladder form two flattened ramped end portions.

8. The fluid storage receptacle of claim 7 wherein one of the two flattened ramped end portions of the inner bladder is sealed by covulcanization of the first insert with the inner bladder, and the other one of the two flattened ramped end portions of the inner bladder is sealed by covulcanization of the second insert with the inner bladder.

9. The fluid storage receptacle of claim 7 wherein each of the first, second, third, and fourth pockets have an extended plug section sandwiched between the exterior sidewall of the inner bladder and the interior sidewall of the outer casing.

10. The fluid storage receptacle of claim 9 wherein one of the two pinched ramp-ends of the outer casing is sealed by covulcanization of the first and second pockets together with the inner bladder and the outer casing, and the other one of the two pinched ramp-ends of the outer casing is sealed by covulcanization of the third and fourth pockets together with the inner bladder and the outer casing.

11. The fluid storage receptacle of claim 7 wherein the means for permitting fluid communication between the interior reservoir and the exterior of the fluid storage receptacle is a first outlet penetrating and sealingly attached to the first insert, and the means for permitting fluid communication between the outer reservoir and the exterior of the fluid storage receptacle is a sealingly attached second outlet.

12. In combination in a fuel cell system, said system comprising:
a collapsible fluid storage receptacle as claimed in claim 4 wherein the interior reservoir is capable of accepting and storing fuel; and
means for dispensing the fuel from the interior reservoir by collapsing the inner bladder.

13. The system as claimed in claim 12 wherein the means for dispensing comprises pressurized air forced into the outer reservoir through the means for permitting fluid communication between the outer reservoir and the exterior of the fluid storage receptacle.

14. A collapsible fuel cell for storing and dispensing fuel comprising:
a generally cylindrical elastomeric reinforced inner bladder having two flattened ramped end portions and interior and exterior sidewalls;
a first and second insert formed of reinforced elastomer, each of which is bonded to juxtaposed interior sidewall portions of the inner bladder nearby one of the flattened ramped end portions to form a reinforcement bridge thereby; a substantial portion of the interior sidewall of the inner bladder and portions of the first and second insert defining an interior reservoir;
a first outlet penetrating the first insert, allowing the interior reservoir to be in communication with the exterior of the fuel cell;
a generally cylindrical elastomeric reinforced outer casing having two pinched ramp-ends and having an interior sidewall that substantially surrounds the inner bladder, the outer casing to be attached to the inner bladder nearby each of the two flattened ramped end portions;
a first, second, third, and fourth pocket formed of reinforced elastomer, each of which is bonded to juxtaposed sidewall portions of the outer casing and the inner bladder to form four reinforcement bridges therebetween; the first and second pocket being located nearby one of the two pinched ramp-ends and the third and fourth pocket being located nearby the other one of the two pinched ramp-ends; a substantial portion of the exterior sidewall of the inner bladder, a substantial portion of the interior sidewall of the outer casing, and portions of the first, second, third, and fourth pockets defining an outer reservoir capable of accepting a pressurized fluid that can collapse the interior sidewalls of the inner bladder; and a second outlet allowing the outer reservoir to be in communication with the exterior of the fuel cell.

15. The fuel cell of claim 14 wherein the first and second inserts are adapted and arranged to inhibit separation of the two flattened ramped end portions of the inner bladder upon pressurization of the interior reservoir; and wherein the first, second, third, and fourth pockets are adapted and arranged to inhibit separation of the two pinched ramp-ends of the outer casing upon pressurization of the outer reservoir.

16. The fuel cell of claim 14 wherein each of the first and second inserts further comprise:
- an inner elastomeric member compatible with the material to which it is bonded;
- an outer elastomeric member compatible with the fluid to which it directly contacts; and
- a tie gum elastomer having reinforcement disposed therewithin, the tie gum elastomer to be sandwiched between, bonded to, and compatible with the inner elastomeric member and the outer elastomeric member.

17. The fuel cell of claim 14 wherein each of the inner bladder and outer casing further comprise two elastomeric adhesion gum layers sandwiching a layer of reinforcement.

* * * * *